United States Patent [19]

Widmer et al.

[11] 3,712,112

[45] Jan. 23, 1973

[54] DEVICE FOR THE TESTING OF SEAMS OF FOIL OR SHEET SEALED CONTAINERS

[75] Inventors: Karl Widmer, Zurich; Horst Zumsteg, Neuhasen, both of Switzerland

[73] Assignee: Schweizerische Aluminum AG, Chippis, Switzerland

[22] Filed: May 17, 1971

[21] Appl. No.: 144,166

[30] Foreign Application Priority Data

May 29, 1970 Switzerland..........................8057/70

[52] U.S. Cl.....................................................73/37
[51] Int. Cl..............................................G01m 3/02
[58] Field of Search.........73/37, 40, 49.2, 49.3, 45.4, 73/45.5

[56] References Cited

UNITED STATES PATENTS

| 3,418,845 | 12/1968 | Helms | 73/45.5 |
| 2,697,935 | 12/1954 | Gordon | 73/45.5 |
| 3,196,665 | 7/1965 | Quackenbush | 73/37 |
| 900,324 | 10/1908 | Swangren | 73/49.3 |

Primary Examiner—Donald O. Woodiel
Attorney—E. J. Berry and L. Rosen

[57] ABSTRACT

A device for the testing of seams of lightweight containers sealed with foil or sheet, the device being especially adapted for testing of the seams. The device comprises a supporting means to support the container except for the seam zone and means to introduce a pressure medium into the container and to increase the pressure thereof until either the seam bursts or a pre-set test pressure is reached.

5 Claims, 1 Drawing Figure

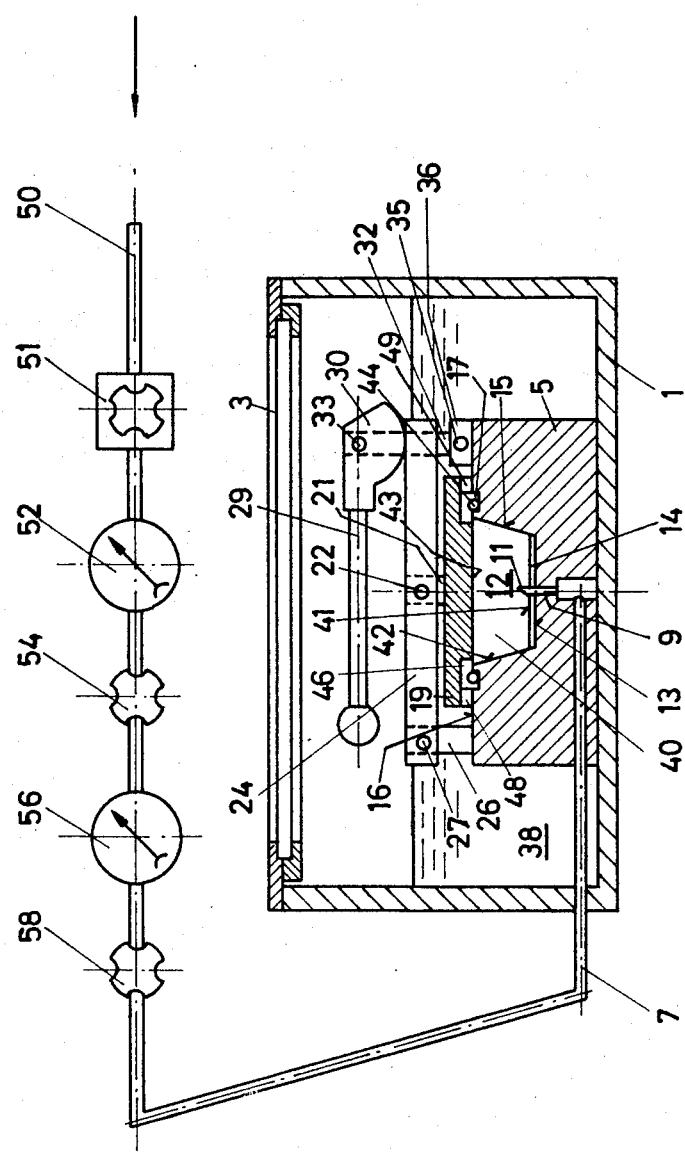

DEVICE FOR THE TESTING OF SEAMS OF FOIL OR SHEET SEALED CONTAINERS

The present invention concerns a device for the testing of containers sealed with foil or sheet. Such containers are known as lightweight containers and are mainly used in the food industry. They consist of a bottom section of plastic sheet or aluminum foil or a foil combined from both, the aluminum foil being up to 0.20 mm thick, and further consist of a lid made similarly. The lid foil is joined to a rim flange of the container bottom by hot sealing. The known testing devices do not make sufficient allowance for the fact that in the testing of containers it is mainly the seams that should be tested, and less so the points where a container might ultimately burst or tear under rising internal pressure.

The object of the present invention is to provide such a testing device. This is characterized by supporting means intended to support the container except for the seam zone, and by means intended to introduce a pressure medium into the container and to increase the pressure thereof until either the seam bursts or a preset test pressure is reached.

An embodiment of the present invention is now to be described by way of example with reference to the accompanying drawing, which shows a section through a device for the testing of the seams of foil-sealed containers.

The said device comprises a vessel 1 with a transparent cover 3. Arranged inside the vessel 1 is a testing die 5 which is provided with a compressed air line 7 passed from outside into the interior. In the center of the bottom of the die 5, a hollow needle 9 provided with a point 11 is connected to the compressed air line 7. The die 5 presents a recess 12 which is adapted to the shape of the containers to be tested and whose bottom 13 is covered with an elastic seal 14, such as a rubber seal. The side walls 15 of the recess 12 are flared outwards, according to the shape of container. Let into the upper terminating surface 16 of the die 5 is an annular groove 17 for receiving the container edge. For the purpose of covering the recess 12, a cover 19 is movably joined to a pivoted lever 24 by a lug 21 and a pin 22. The lever 24 is pivoted on a pin 27 held by a support 26, which forms part of the die 5. Arranged above the lever 24 is a locking lever 29 with a cam 30 which is connected by a pin 33 to a fishplate 32 in the manner shown in the drawing. A locking pin 35 permits the fishplate 32 to be held in a socket 36. For testing, the vessel 1 has a water fill 38.

A container 40 to be tested is placed in the recess 12, It presents a bottom 41 and sides 42. It is sealed with a thin foil top 43. The container rim 44 is curled. The cover 19 presents an annular groove 46; adjacent to this radially outwards are supporting webs 48 with intermediate channels 49.

The compressed air for testing the tightness of the seam 44 passes through a compressed air line 50, a reducing valve 51, a pressure gauge 52, a shut-off valve 54, another pressure gauge 56, a venting valve 58, the compressed air line 7 and the hollow needle 9.

For testing the container 40, the procedure is to open the vessel cover 3 and the cover system of the die 5, place the container 40 into the recess 12, close the cover system pivoting on the pin 27 and fasten it to the die 5 by the locking pin 35. Then, by moving the locking lever 29 into the locking position shown, the container 40 is pressed into the recess 12 and held there. During the pressing process, the point 11 of the hollow needle 9 pierces the container bottom 41. To prevent any test medium from being squeezed out between container bottom 41 and hollow needle 9, the container bottom 41 rests tight against the seal 14. The cover 19 covers the greater part of the foil top 43. It clears the container top seam 44, which is thus the only portion of the whole container 40 that has no outer counter-support. Now, the reducing valve 51 is opened sufficiently until the pressure gauge 52 indicates the test pressure required. Then the shut-off valve 54 is slowly opened, the pressure reached inside the container 40 being indicated by the gauge 56. The compressed air passes through the line 7 and the hollow needle 9 into the container 40, in which it builds up a pressure corresponding to that indicated by the gauge 56. As all parts of the container are supported outside, except for the container top seam 44, which is to be tested, there is no danger of the container failing at any other point. If the test pressure is reached and no air bubbles rise in the water fill 38 and the pressure indicated by the gauge 56 does not collapse, the container 40 is tight. Otherwise, the internal pressure in the container 40 will cause the top seam 44 to open at its weakest point, in which case the gauge 56 will show the tester at what internal pressure the seam 44 has failed. The air escaping passes through the intermediate channels 49 into the water fill and rises in visible bubbles.

After the test, the shut-off valve 54 is closed, and the venting valve 58 is opened to let the pressure out of the container 40, if this is tight. After withdrawal of the locking pin 35, the cover system is opened, the tested container 40 removed, and the next one placed in position. The process is then repeated in the manner described.

What is claimed is:

1. Device for the testing of seams of containers sealed with foil or sheet, comprising outer supporting means intended to support all parts of the container with the exception of the seam zone thereof, and by means intended to introduce a pressure medium into the container and increase the pressure thereof until either the seam fails or a pre-set pressure is reached.

2. Device according to claim 1, comprising a die against which the bottom and the sides of the container can rest, and that a hollow needle projects from the bottom of the die into the hollow space provided for receiving the container, and that a seal is arranged around the hollow needle on the bottom of the die, the arrangement being such that when the container is placed in position in the die, the hollow needle pierces the container bottom and the seal seals off the clearance between the hollow needle and the container bottom.

3. Device according to claim 1, wherein the top of the container is supported within the seam zone, the supporting means being designed to depress the container into the die.

4. Device according to claim 1 wherein the supporting means for the container top consists of a cover which is movably suspended near its middle and which is lockable by a lever-operated cam.

5. Device according to claim 1, wherein the supporting means comprises a cover having escape grooves for escaping test medium.

* * * * *